United States Patent [19]
Shelnick

[11] 3,850,408
[45] Nov. 26, 1974

[54] UNDERWATER WEAPON
[75] Inventor: Thomas Shelnick, Pittsburgh, Pa.
[73] Assignee: The Shelnick Corporation, Pittsburgh, Pa.
[22] Filed: Aug. 10, 1973
[21] Appl. No.: 387,318

Related U.S. Application Data
[62] Division of Ser. No. 223,458, Feb. 4, 1972, Pat. No. 3,751,843.

[52] U.S. Cl................ 251/251, 251/289, 251/290, 251/340, 251/343
[51] Int. Cl.......................... F16k 31/528
[58] Field of Search ........... 251/205, 251, 284, 289, 251/290, 297, 318, 319, 320, 321, 340, 343; 43/6

[56] References Cited
UNITED STATES PATENTS
| | | | |
|---|---|---|---|
| 1,368,171 | 2/1921 | Linet | 251/289 |
| 3,479,003 | 11/1969 | Vollmer | 251/289 |
| 3,645,500 | 2/1972 | Walter | 251/340 |

FOREIGN PATENTS OR APPLICATIONS
1,127,161  4/1962  Germany ........................ 251/340

Primary Examiner—William R. Cline
Assistant Examiner—David R. Matthews
Attorney, Agent, or Firm—Carothers and Carothers

[57] ABSTRACT

An underwater weapon principally for hand use for insertion into a fish after which upon operation of multidirectional release means in the form of a valve, fluid in the form of a liquid or gas is expelled into the interior of the fish causing the fish to become bloated and incapacitated for underwater mobility. The underwater weapon is provided with a hermetically sealed chamber to receive a removable flask containing fluid under pressure. A stiletto is provided on the forward end of the body and is provided with passage means in communication with the chamber so that upon puncture of the flask, the release of the fluid through the passage means in the stiletto may be controlled by the hand operated release means.

3 Claims, 3 Drawing Figures

PATENTED NOV 26 1974 3,850,408

UNDERWATER WEAPON

CROSS REFERENCE TO RELATED APPLICATION

This is a divisional of patent application Ser. No. 223,458 filed Feb. 4, 1972, now U.S. Pat. No. 3,751,843 in the name of Thomas Shelnick.

BACKGROUND OF THE INVENTION

This invention relates generally to underwater weapons and more particularly to underwater stilettos used for underwater hunting for not only killing the fish by means of the stiletto but also inflating the fish by means of a flask containing a fluid, such as a liquid or carbon dioxide or other such gas, provided in the body of the underwater weapon which may be selectively released at the judgment of the underwater user or skin diver, which induces paralysis of the fish or otherwise immobilizes the fish from endangering the user. Also, the inflation of the fish will cause the fish to rise to the surface where it may be easily handled, particularly if the fish is of large size.

Such underwater weapons are known in the art as exemplified in U.S. Pat. Nos. 2,970,399 (43-6) and 2,981,026 (43-6). Each of these patents shows a stiletto-type instrument for use in underwater killing of fish and other such species such as sharks wherein the weapon is hand used by inserting the same into the fish whereupon the pressure of impact into the fish causes the stiletto portion of the weapon to move rearwardly to puncture a flask containing fluid under pressure. Means are provided between the flask and the pointed end of the stiletto to permit the fluid to pass through the stiletto and into the body of the fish thereby inflating the fish to induce immobility and subsequent death. As shown in U.S. Pat. No. 2,970,399, such weapons can also be mounted on the forward end of an underwater spear adapted for mounting on an underwater speargun.

It has been found that in the use of such underwater weapons of the type herein discussed and disclosed, the user, such as a skin diver, would be in a better position to use such weapons, particularly when hand held, by using his own judgment as to when and in what manner the fluid should be discharged from the weapon and into the fish or other such species being attacked by the user, without depending upon the force used to plunge the stiletto portion of the underwater weapon into the fish as the sole means for determining as to when the fluid should be released from the flask in the underwater weapon through the stiletto means of the weapon and thence into the cavity of the fish.

Reference is also made to my prior U.S. Pat. No. 3,530,580, issued Sept. 29, 1970 for Under-Water Weapon, disclosing an underwater weapon for injecting poison into a fish or other such species.

SUMMARY OF THE INVENTION

The principal object of this invention is the provision of an underwater weapon having an elongated body with a hermetically sealed chamber therein to receive a removable flask containing fluid under pressure. Stiletto means are provided on the forward end of the body and in communication with the chamber so that upon piercing of the flask in the chamber, the fluid under pressure will be expelled through the stiletto portion of the weapon and into the body of the fish or other species being attacked by the underwater user. In connection with the present invention, the principal feature specifically resides in the means used to control the release of the fluid through the stiletto subsequent to the actual operation of rupturing the flask thereby placing the chamber of the underwater weapon under pressure by means of the fluid in the flask.

Another principal feature comprising this invention is the provision of a multidirectional release means to be selectively used by the underwater user to release fluid under pressure through passage means provided in the stiletto portion of the underwater weapon, which release means is operated by the underwater user at his own discretion and judgment.

Another feature comprising this invention is the provision of a valve in the form of a multidirectional release means for an underwater weapon which may be operated by an underwater user to open the same and permit the release and passage of fluid through the stiletto portion of the underwater weapon no matter in which position the underwater weapon is held by the user. This is an important safety feature with respect to the present invention, so that the user may conveniently release the fluid contained in the chamber provided in the handle portion of the underwater weapon by depressing a valve actuator which is contained completely around the entire surface area of the forward end of the handle portion of the underwater weapon. Thus, if quick action is necessitated by the underwater user, it is unnecessary for him to make sure that he is holding the underwater weapon in a particular position in order to properly activate the multidirectional release means to permit the passage of fluid through the stiletto portion of the weapon upon insertion of the same into the fish to be killed or captured. In this connection, reference is made to my U.S. Pat. No. 3,530,580 wherein the handle portion of the weapon is provided with a finger grip so that the weapon must be held in a particular position for the underwater user to depress the fluid release means to insert poison or gas into the cavity of the fish.

Another feature of the present invention is the provision of piercing means provided at the rearward end of the handle portion of the underwater weapon which may be used to rupture the flask containing fluid under pressure in the handle of the underwater weapon to "activate" the weapon prior to use of the weapon by insertion into a fish or other such creature to be killed or captured.

Other objects and advantages appear in the following description and claims.

The accompanying drawings show, for the purpose of exemplification without limiting the invention or the claims thereto, certain practical embodiments illustrating the principles of this invention wherein:

Figure 2:
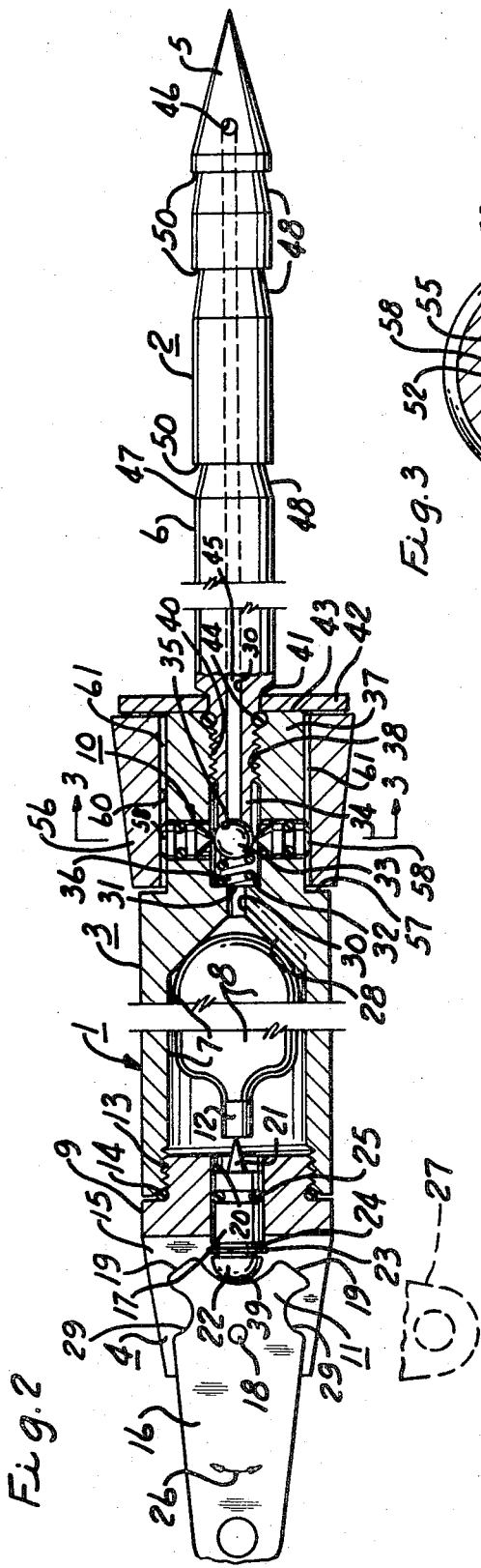
FIG. 2 is also a longitudinal view of the underwater weapon as shown in FIG. 1 with portions thereof shown in cross-section to illustrate the interior of the weapon.

Reference is now made to the Figures wherein there is shown the underwater weapon 1 comprising three principle parts which are the stiletto means 2, the handle or body portion 3 and the end cap section 4.

The stiletto means 2 comprises the pointed head 5 and the shank section 6. The body portion 3 is provided with the chamber 7 to carry the flask 8 containing fluid under pressure and also at its forward end provided with the multidirectional release means 10 selectively operative by the underwater user. The end cap section 4 is provided with the piercing means 11 and also has means for hermetically sealing the chamber 7 prior to rupturing the flask 8.

As seen clearly from FIG. 2, upon removal of the end cap portion 4, a flask 8 may be inserted into the chamber 7 provided in the body portion 3 with the nipple 12 facing to the rear of the weapon 1. The end cap portion 4 is then secured to the end of the body portion 3 by means of the engaging threads indicated at 13. The chamber 7 is hermetically sealed at its rear portion by means of the O-ring 14. The surface 9 of the cap portion 4 may be knurled.

A transverse slot 15 is provided through the rear section of the end cap portion 4 to receive the pivotal lever 16, which in combination with the firing pin 17 constitutes the piercing means 11. The pivotal lever 16 is pivoted on the pin 18 through the end cap portion 4 so that the pin 18 is in a direction normal to the transverse slot 15.

The forward end of the pivotal lever 16 is provided with a pair of protrusions or extended portions 19 forming the recessed area 39. The forward end of lever 16 is also provided with the side recesses indicated at 29. As part of the piercing means 11, the firing pin 17 is provided for longitudinal movement in the aligned cylindrical aperture 20 in the body of end cap portion 4. Firing pin 17 is provided at its forward end with a puncturing pin 21 and its rearward extent with the dome or rounded portion 22. So that the firing pin 17 does not become disassociated with the end cap portion 4, the annular clip or ring 23 is provided in groove 24 below the dome 22 of the firing pin in order to prevent the firing pin from being withdrawn through the aperture 20 and out of the forward end of the cap portion 4. Also, it should be noted that firing pin 17 is provided with an annular groove in its body portion to receive the O-ring 25 to provide for hermetic sealing between the firing pin 17 and the aperture 20.

From the foregoing explanation, it can be readily seen that upon rotation of the pivotal lever 16 in either direction as indicated by the arrow 26, one of the two protrusions 19 will cause forward movement of the firing pin 17 within the aperture 20 so that the puncturing pin 21 is caused to engage the nipple 12 of the flask 8. It can be seen in FIG. 2 that the lever 16 may be rotated to the position as indicated by the dotted line at 27 so that the corresponding side recess 29 is in engagement with the dome 22 of the firing pin 17. With the lever in this position, it is insured that proper contact has been made by the puncturing pin 21 with the nipple 12 of the flask 8 to rupture the flask 8 and to provide for charging the chamber 7 with the fluid contained in the flask. Hermetic sealing means provided in the form of the O-rings 14 and 25 insures that the fluid is retained in chamber 7 with regard to the rearward portion of the chamber 7 of the weapon 1.

The lever 16 may be maintained in the dotted line position 27 after the rupturing of the flask 8 has been accomplished, although this is not necessary.

It will be noted upon viewing FIG. 2 that the forward end of the chamber 7 is provided with a longitudinal passageway indicated at 28 which is provided in the chamber 7 to insure that upon exposure of the fluid contained in the flask 8 into the chamber, the fluid can readily escape to the fluid passage means 30 through the multidirectional release means 10. Thus upon rupture of the flask 8, the fluid contained in chamber 7 will be held within the chamber 7 by the multidirectional release means 10 which is separated from chamber 7 by means of the connecting passage 31 which forms part of the fluid passage means 30.

The multidirectional release means 10 consists generally of the valve mechanism wherein there is provided the valve chamber 32 for housing the ball valve 33. The rearward end 34 of the shank 6 of the stiletto means 2 provides a valve seat 35 for the ball valve 33. Means for biasing the ball valve 33 into its normal biased position in seating engagement with the valve seat 35 is provided through any convenient spring means and in the embodiment shown is in the form of the coil or valve spring 36.

As can be seen, the multidirectional release means 10 is housed in the forward cylindrical portion 37 of the body portion 3 and is provided with the threaded opening 38 leading to the valve chamber 32. Threaded opening 38 receives the threaded end portion 34 of shank 6, the length of end portion 34 being dependent upon the positioning of ball valve 33 within the chamber 32 which is governed by the placement of the shoulder 31 of shank 6 in combination with the cover disc 42. Thus, upon engaging the threaded portion 40 of the shank end portion 34 into the threaded opening 38 of the cylindrical portion, cover disc 42 will become in tight engagement with the end face 43 of the cylindrical portion 37, thereby properly seating the hermetic sealing means in the form of O-ring 44.

From the foregoing, it can be readily seen that upon displacement of ball valve 33 rearwardly within the valve chamber 32, any fluid under pressure already existing in chamber 7 of the body portion 3 will be permitted to pass through the valve chamber 32 and thence along the fluid passage means 30 in the form of the longitudinal passage 45 in shank 6 and thence through the transverse passage 46 in the pointed head 5 to the exterior of the weapon 1. Transverse passage 46 thereby forms part of the fluid passage means 30.

In connection with the stiletto means 2, the circumferential surface 47 of the shank 6 is provided with a plurality of circumferential grooves 48 forming the shoulders 50 which, as well known in this art, are provided for prevention of immediate removal of the stiletto means 2 after insertion of the same into the fish or other such species as well as providing a sealing communication with the body of the fish to prevent the escape of fluid through the opening provided by the use of the weapon upon actuation of the multidirectional release means 10.

Figure 3:
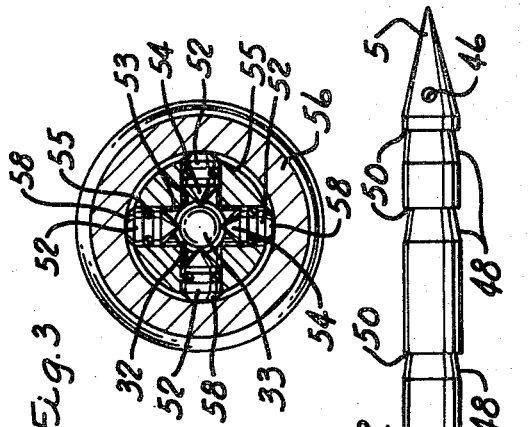
FIG. 3 is a cross-sectional view taken along the line 3—3 of FIG. 2 showing the detail construction of the multidirectional release means.
Figure 1:
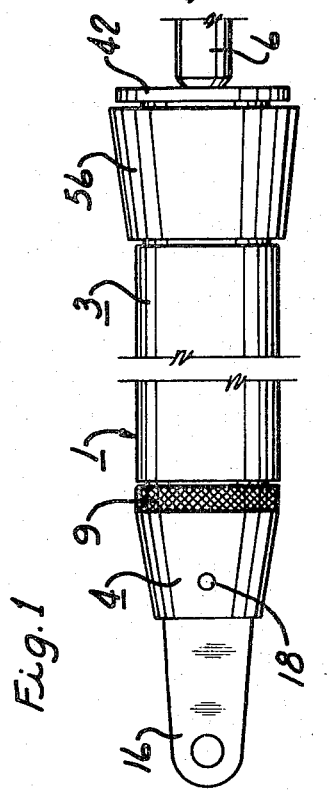
FIG. 1 is a longitudinal view of the underwater weapon comprising this invention.

Reference is now again made to the multidirectional release means and more particularly to the means for actuating the release means which is shown in both FIGS. 2 and 3. Transverse valve actuating means are shown in the form of a plurality of valve actuator pins 52 which are received in corresponding radially disposed apertures 53, that is, radial relative to the cylindrical body portion 37. As can be seen, the actuator pins 52 can move inwardly and outwardly within their respective apertures 53. However, the pressure of the biasing means in the form of the valve spring 36 against the ball valve 33 to seat the same in the valve seat 35, will cause the actuator pins 52 to move outwardly relative to their respective apertures 53 due to the pressure applied by the ball valve 33 against the pointed nose portion 54 of each of the actuator pins 52. In this connection, it should be noted that the apertures 53 as well as the alignment of each of the nose portions 54 of the actuator pins 52 are slightly forward of the center line of the ball valve 33 when the latter is normally in seated engagement in the valve seat 35. Thus, the pressure of ball valve 33 will force the tapered nose portion 54 of each of the actuator pins 52 radially outward relative to the valve chamber 32. In order again to insure hermetic sealing of the entire interior of the weapon 1, each of the actuator pins 52 is provided with seating means in the form of the O-rings 55 so that the fluid as supplied by the flask 8 and directed into the chamber 7 is maintained therein until releasing of the same through the operation of the release means 10 for passage of the fluid through the fluid passage means 30.

From the foregoing, it will be readily seen that if pressure is applied to any one of the actuator pins 52 to cause the same to move inwardly in its respective radial aperture 53, pressure will be caused to be applied to the ball valve 33 thereby unseating the ball valve from its valve seat 35 against the pressure of the valve spring 36. This will permit the passage of any fluid supplied in the chamber 7 of the body portion 3 to exit around ball valve 33 and thence through the fluid passage means 30.

The reason for the provision of a plurality of valve actuator pins 52 is to insure the user in using and gripping the weapon 1 to actuate the fluid release, no matter what position the handle or body portion 3 might be held by the user when employed in underwater attack of fish and other such underwater species. This will be appreciated, particularly when such underwater species may be sharks, wherein the underwater user such as a skin driver must be able to have a weapon which he can handle with relative ease and wherein the application of the fluid into the shark can be readily released without any difficulty because of the multiplicity of different hand gripping positions at which the weapon 1 can be held and the multidirectional release means 10 can be operated.

In this connection, actuation of the release means 10 is accomplished by pressing the annular sleeve member 56 which is provided to be somewhat loosely engaged over the exterior cylindrical surface of the cylindrical body position 37 between the annular shoulder 57 of the body portion 3 and the cover disc 42 as shown clearly in FIG. 2. The under surface 60 of the annular sleeve member 56 is capable of engaging any of the rearward portions 58 of the actuator pins 52 in view of the fact that each of these pins is normally maintained in an outwardly biased position relative to their radial apertures 53, as shown in FIG. 2, in view of the biasing of the valve spring 36 against the ball valve 33. By the same token, because of the loose engagement of the annular sleeve member 56 as exhibited by the spacing at 61 between the under surface 60 and the outer cylindrical surface of the forward cylindrical portion 37, pressure may be applied by the finger or the thumb of the user of the weapon at any position along the outer surface of the annular sleeve member 56 to actuate any one or more of the actuator pins 52 to cause the same to move inwardly against the ball valve 33 and force the ball valve 33 rearwardly in the valve chamber 32 against the pressure of the valve spring 36 thereby releasing the fluid present in chamber 7 through the fluid passage means 30. Upon release of the pressure applied by the finger or thumb of the user, the force of the valve spring 36 will cause the ball valve 33 to properly seat in the valve seat 35 and at the same time cause the actuator pin or pins 52 which were caused to unseat the ball valve 33 to move outwardly of their radial apertures 53 and again permit their rearward portions 58 to extend into the spacing indicated at 61. Thus, it can readily be seen that the multidirectional release means 10, comprising a principal feature of the present invention, is very valuable in underwater use and employment, particularly in the following manner. The underwater user, upon approaching an area of possible danger from attack, such as from a shark, or in preparation of attacking a large fish such as in the case of hunting, may immediately activate the underwater weapon 1 by rotating the pivotal lever 16 to the position shown by the dotted line at 27 thereby causing the piercing means 11 to rupture the flask 8 and supply the fluid under pressure within the body chamber 7 of the body portion 3. Upon use of the weapon in the form of the stiletto means 2, the weapon having been previously "charged," the user may press down on the annular sleeve member 56 with his thumb, no matter in what position the handle or body portion 3 is being gripped in the hand of the user at that particular time. This will release the fluid under pressure in chamber 7 to permit the same to pass through the fluid passage means 30 as previously indicated and into the cavity of the fish to cause the fish to become bloated or otherwise immobile and paralyzed and, at the same time, render an aid in the form of causing the fish to become buoyant and rise to the surface of the water rendering it easier for handling of the fish for retrieving it from the water, particularly in the case of large fish.

I claim:

1. A valve adapted to be selectively operated from multiple positions around the valve housing comprising an annular valve casing having a valve chamber with an inlet and outlet, a valve seat in said chamber defining said outlet, a valve biased to normally seat in said valve seat to close off said outlet, at least three apertures through said casing symmetrically and radially disposed relative to the axis of said outlet and communicating with said chamber, valve actuators in each of said apertures contacting said valve and each having portions thereof exposed above the outside surface of said casing which are depressable to displace said valve off said seat, an annular sleeve member retained on said casing over and in contact with all of said exposed portions of said actuators such that said valve is unseated by pressing said ring at any position therearound.

2. The valve of claim 1 wherein said valve is a ball valve, said valve actuators positioned to engage the surface of said ball between said seat and the center line of the ball transverse to the outlet seat axis to force said ball valve rearwardly off said seat.

3. The valve of claim 2 wherein said actuators are pins having pointed ends in engagement with said ball valve.

* * * * *